United States Patent
Kang et al.

(10) Patent No.: US 7,817,505 B2
(45) Date of Patent: Oct. 19, 2010

(54) OPTICAL PICKUP ACTUATOR AND OPTICAL RECORDING AND/OR REPRODUCING APPARATUS AND METHOD FOR THE SAME

(75) Inventors: Hyung-Joo Kang, Seoul (KR); Young-bin Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 903 days.

(21) Appl. No.: 10/720,744

(22) Filed: Nov. 25, 2003

(65) Prior Publication Data

US 2004/0202068 A1   Oct. 14, 2004

(30) Foreign Application Priority Data

Nov. 26, 2002   (KR) .................. 10-2002-0074126

(51) Int. Cl.
    *G11B 7/00*   (2006.01)
(52) U.S. Cl. .................................. 369/44.14
(58) Field of Classification Search ............... None
    See application file for complete search history.

(56) References Cited

U.S. PATENT DOCUMENTS

| 5,488,603 | A | | 1/1996 | Tomita et al. | |
| 5,905,255 | A | * | 5/1999 | Wakabayashi et al. | ... 250/201.5 |
| 6,130,418 | A | * | 10/2000 | Van Rosmalen et al. | . 250/201.5 |
| 6,181,670 | B1 | * | 1/2001 | Nagasato | ............ 720/681 |
| 6,341,104 | B1 | * | 1/2002 | Yamaguchi et al. | ...... 369/44.15 |
| 6,829,202 | B2 | * | 12/2004 | Jeong | ............... 369/44.15 |
| 7,075,872 | B2 | * | 7/2006 | Matsui | ............. 369/53.19 |
| 7,126,744 | B2 | * | 10/2006 | Turner et al. | ............. 359/298 |
| 7,310,289 | B2 | * | 12/2007 | Pae et al. | ............ 369/44.14 |
| 2002/0054559 | A1 | | 5/2002 | Choi | |
| 2003/0198148 | A1 | * | 10/2003 | Choi | ............ 369/44.16 |
| 2004/0130976 | A1 | * | 7/2004 | Tanaka | ........... 369/44.16 |
| 2004/0151085 | A1 | * | 8/2004 | Funakoshi et al. | ....... 369/44.16 |

FOREIGN PATENT DOCUMENTS

| JP | 58-062832 A | 4/1983 |
| JP | 58-098850 A | 6/1983 |
| JP | 11-203697 | 7/1999 |
| JP | 2002-109766 | 4/2002 |

OTHER PUBLICATIONS

European Search Report issued May 8, 2007 in corresponding European Patent Application No. 03 257 423.8-1232.
European Search Report issued Jan. 8, 2007 in corresponding European Patent Application 03 25 7423.
Chinese Office Action issued Jun. 9, 2006 in Related Chinese Application No. 2003101209618.

* cited by examiner

*Primary Examiner*—Daniell L Negrón
*Assistant Examiner*—Parul Gupta
(74) *Attorney, Agent, or Firm*—Staas & Halsey LLP

(57) ABSTRACT

An optical pickup actuator and an optical recording and/or reproducing apparatus and method using the same. The optical pickup actuator includes a blade, a plurality of suspensions, first and second coil members, and a magnet member. An objective lens is placed on one side of the blade. Each of the suspensions is coupled at one end to the blade and fixed at the other end to a holder provided at one side of a base, such that the suspensions movably support the blade. The first and second coil members are installed on the base to be separated from each other, with the magnet member being installed on the blade between the first and second coil members.

10 Claims, 6 Drawing Sheets

OPTICAL PICKUP ACTUATOR AND OPTICAL RECORDING AND/OR REPRODUCING APPARATUS AND METHOD FOR THE SAME

CROSS-REFERENCE TO RELATED APPLICATIONS

This application claims the priority of Korean Patent Application No. 2002-74126, filed on Nov. 26, 2002, in the Korean Intellectual Property Office, the disclosure of which is incorporated herein in its entirety by reference.

BACKGROUND OF THE INVENTION

1. Field of the Invention

The present invention relates to an optical pickup actuator for which a moving unit performance, due to heat, is not reduced when used as a slim, or miniaturized, optical pickup actuator, and an optical recording and/or reproducing apparatus and method for the same.

2. Description of the Related Art

Generally, optical pickups are used in optical recording and/or reproducing apparatuses to record and/or reproduce information on an optical disc, without contacting the disc, while moving along a radial direction of the optical disc. Optical pickups include an optical pickup actuator for driving an objective lens in tracking and focusing directions of the optical disc to radiate a light spot on a desired track of the optical disc.

In portable devices, such as a notebook computers, an optical recording and/or reproducing apparatus must be made to be slim and lightweight. However, available space for installing an entire recording and/or reproducing system of the portable devices is limited. Thus, an optical pickup actuator used in the portable devices is required to be slim.

In portable devices, an optical pickup includes a mirror for reflecting incident light toward an objective lens. In order to reduce the distance between the objective lens and the reflecting mirror of the optical pickup, to make the optical pickup slim, an asymmetric optical pickup actuator has been proposed with a driving axis of the optical pickup actuator and an optical axis of the objective lens being disposed differently from each other.

FIG. 1 is a perspective view schematically showing one example of a conventional asymmetric optical pickup actuator.

Referring to FIG. 1, the conventional asymmetric optical pickup actuator includes a blade 2, with an objective lens 1 placed on one side thereof, a plurality of wires 6, and a magnetic circuit. One end of each of the plurality of wires 6 is coupled to the blade 2 and the other end is fixed to a holder 3, provided on a base 9, such that all components of a moving unit including the blade 2, can move in a focusing direction F and a tracking direction T with respect to the base 9. The magnetic circuit thereby drives the moving unit in the focusing direction F and the tracking direction T.

The magnetic circuit includes focusing coils 4 and tracking coils 5 which are installed on the blade 2, a pair of magnets 7 that generate an electromagnetic force by interacting with current flowing in the focusing coils 4 and the tracking coils 5, to drive the moving unit, and a yoke 8.

When current is applied to the focusing coils 4 and the tracking coils 5, an electromagnetic force generated, due to interaction between the current flowing in the focusing coils 4 and the tracking coils 5 and the magnetic flux of the magnets 7 being applied to the focusing coils 4 and the tracking coils 5, thereby drives the moving unit in the focusing direction F and the tracking direction T. The objective lens 1 placed on the blade 2, accordingly, moves in the focusing direction F and the tracking direction T.

However, in the conventional asymmetric optical pickup actuator, since the coil, particularly, the focusing coils 4, is directly in contact with the blade 2, in which the objective lens 1 is mounted, heat generated by applying current to the coils 4 and 5 is directly transferred to the blade 2 and the objective lens 1, thereby reducing the rigidity of the blade 2. Thus, the performance of a conventional design of the asymmetric optical pickup actuator is deteriorated, resulting in the control performance being changed and the objective lens 1 being damaged.

Particularly, it is relatively difficult to disperse heat from a slim optical recording and/or reproducing apparatus because the corresponding actuator is placed inside an optical pickup and because the size of the resultant optical pickup is smaller than other asymmetrical optical pickup designs for non-portable devices. Since the coils 4 and 5 directly act as heat sources for the moving unit when installed in the blade 2, the rigidity of the blade 2 is reduced at least because of the temperature problem inside portable devices, e.g., a notebook computer. Thus, the performance of a conventional design of the optical pickup actuator deteriorates so much so as to change tracking and focusing control performance.

For example, according to this conventional optical pickup actuator structure, a second resonance frequency exists around 20 kHz, before applying current. However, the second resonance frequency moves to around 10 kHz, due to reduction in the rigidity of the blade 2, after current is applied and heat is generated.

Changes in control performance, due to heat as described above, accounts for a large portion of defects in products.

Further, according to this conventional optical pickup actuator structure, where the coils 4 and 5 are installed on the moving unit, a plurality of components, for example, a printed circuit board (PCB) 10 and the wires 6 for electrical connection, must be installed on the blade 2 to apply current to the coils 4 and 5, in addition to the required additional soldering process.

As a height of the slim optical pickup actuator may be about 4-5 mm, soldering must be performed within a range of a thickness of 1 mm or less.

Thus, the soldering process must be performed manually, thereby limiting the mass-productivity of production of the optical pickup actuator. Further, the defect rate of the actuator increases, including large deviations between optical pickup actuator assemblies as a result at least due to the manual soldering process.

Further, six wires are required for driving an optical pickup actuator for triaxial movement in a focusing direction, a tracking direction, and a radial tilt direction. However, the optical pickup actuator is restricted in space, making it difficult to install the required plurality of wires. As the number of wires increases, the process for installing the wires becomes more difficult, thereby increasing the defect rate of the actuator.

In addition, in the conventional optical pickup actuator, since only about ¼ of a total length of the focusing coils 4 is used, in effect, to control the actuator. The unnecessary portion of the focusing coils 4 also prevents the actuator from being reduced in size and increases the asymmetry of the actuator.

SUMMARY OF THE INVENTION

Embodiments of the present invention provided an optical pickup actuator, whose moving performance unit due to heat is not reduced when used as slim type optical pickup actuator, and which can be miniaturized with greatly reduced defect rates over conventional optical pickups, due at least to the ease in producing the optical pickups, and an optical recording and/or reproducing apparatus and method using the same.

Additional aspects and/or advantages of the invention will be set forth in part in the description which follows and, in part, will be obvious from the description, or may be learned by practice of the invention.

To accomplish the above and/or other aspects and advantages, embodiments of the present invention provide an optical pickup actuator, including a blade with an objective lens, a plurality of suspensions coupled at one end to the blade and fixed at another end to a holder, provided at one side of a base, such that the suspensions movably support the blade, first and second coil members installed on the base, separated from each other, and a magnet member installed on the blade between the first and second coil members.

To accomplish the above and/or other aspects and advantages, embodiments of the present invention provide an optical recording and/or reproducing apparatus, comprising an optical pickup having an actuator for driving an objective lens, is movably installed in a radial direction of a recording medium, and records and/or reproduces information to/from the recording medium, and a controller controlling a focusing servo and a tracking servo of the optical pickup, wherein the optical pickup actuator includes a blade with an objective lens, a plurality of suspensions coupled at one end to the blade and fixed at another end to a holder, provided at one side of a base, such that the suspensions movably support the blade, first and second coil members installed on the base, separated from each other, and a magnet member installed on the blade between the first and second coil members.

To accomplish the above and/or other aspects and advantages, embodiments of the present invention provide an optical pickup actuating method, including moving a blade, including a lens, in tracking and/or focusing directions, and driving a coil system, separated from the blade, such that an interaction with a magnet on the blade controls the moving of the blade in the tracking and/or focusing directions.

To accomplish the above and/or other aspects and advantages, embodiments of the present invention provide an recording and/or reproducing method, including registering an electrical signal representative of data stored, or to be stored, on a recording medium, and performing the above optical pickup actuating method to control the recording and/or reproducing of data to/from the recording medium to generate the electrical signal registered as the stored data, when performing the reproducing process, or to stored data on the recording medium based on the electrical signal, when performing the recording process.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
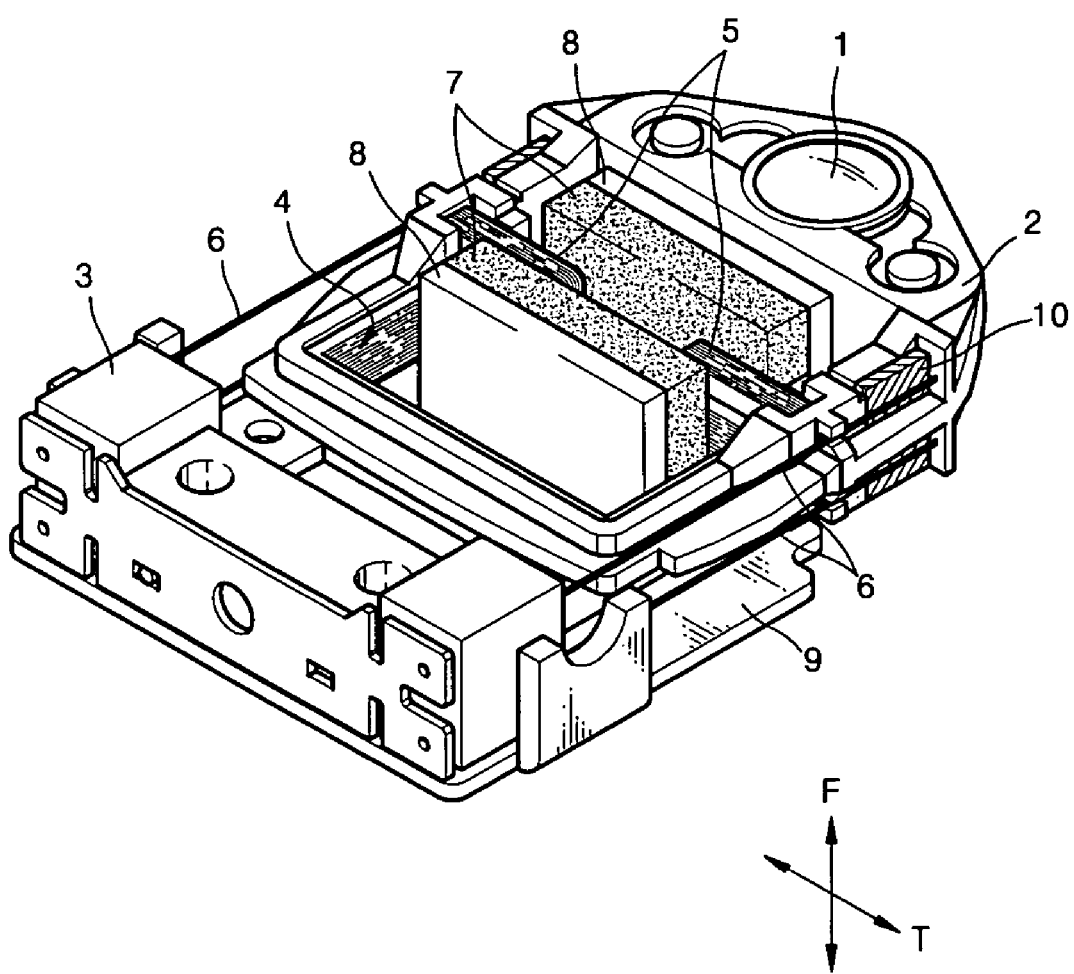
FIG. 1 is a perspective view schematically illustrating a conventional asymmetric optical pickup actuator.

Reference will now be made in detail to the embodiments of the present invention, examples of which are illustrated in the accompanying drawings, wherein like reference numerals refer to the like elements throughout. The embodiments are described below to explain the present invention by referring to the figures.

An optical pickup actuator, according to an embodiment of the present invention, has a configuration in which a magnet member is installed in a moving unit and coils, and an electric structure for applying a driving current to the coils, are provided on a base, so that the structure of the moving unit is simple, problems due to heat do not occur, and manufacture of the optical pickup actuator is easy.

Figure 2:
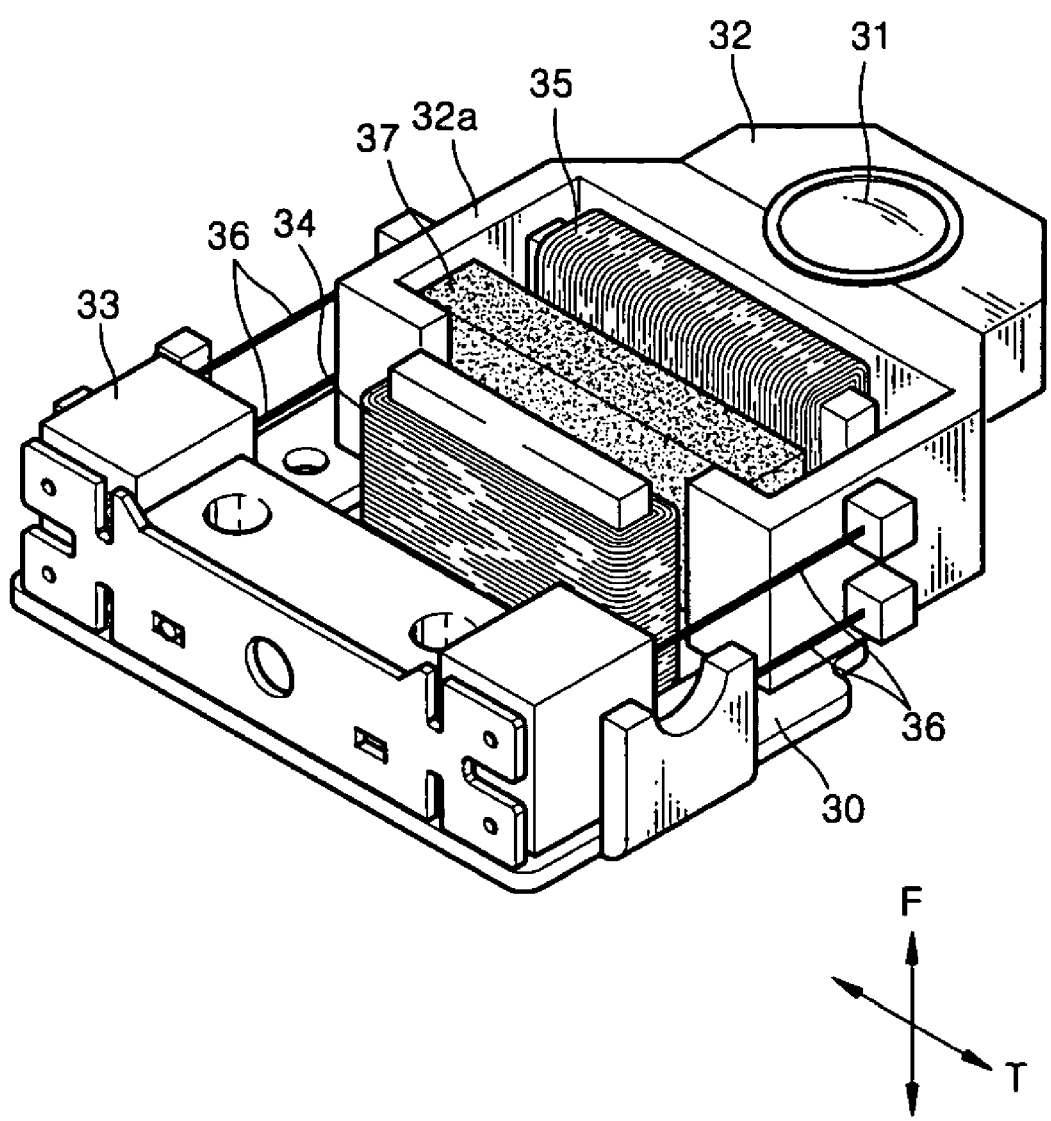
FIG. 2 is a partial exploded perspective view schematically illustrating an optical pickup actuator, according to an embodiment of the present invention.
Figure 3:
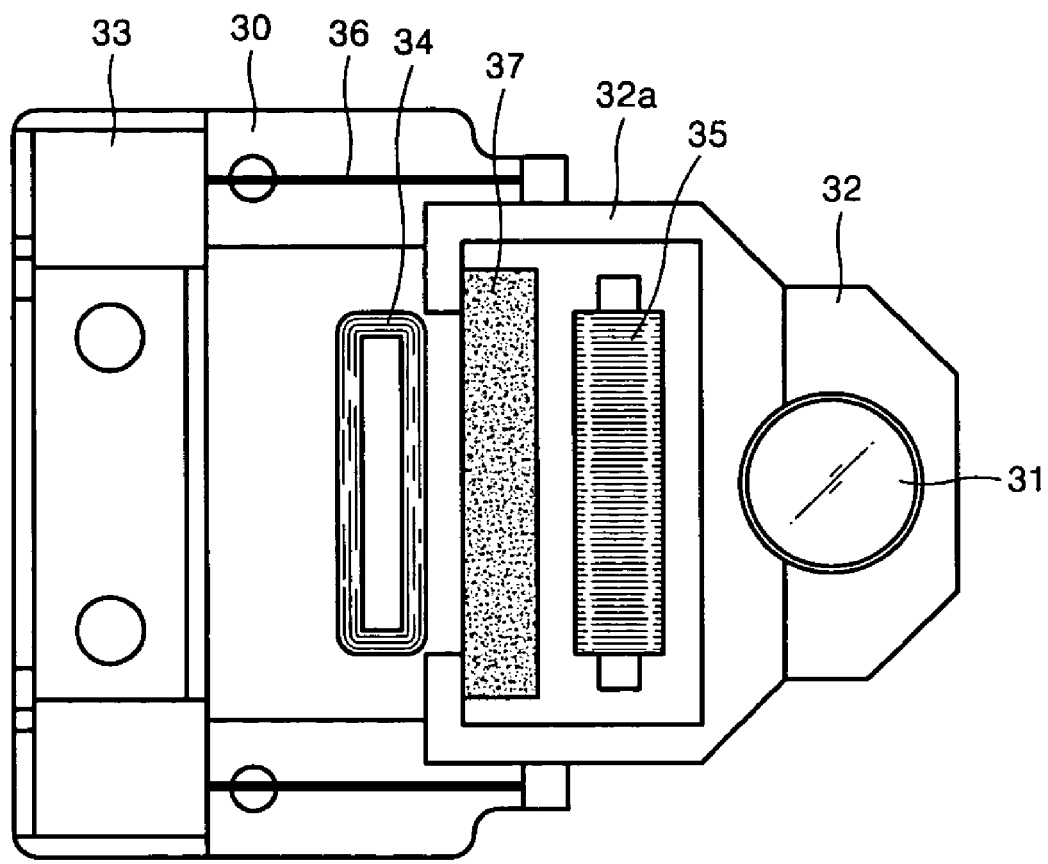
FIG. 3 is a plan view of main parts of the optical pickup actuator of FIG. 2.

FIG. 2 is a partial exploded perspective view schematically illustrating an optical pickup actuator, according to an embodiment of the present invention, and FIG. 3 is a plan view of main parts of the optical pickup actuator of FIG. 2.

Referring to FIGS. 2 and 3, the optical pickup actuator includes a blade 32, first and second coil members 35 and 34, a single magnet member 37, and a plurality of suspensions 36. The blade 32 is movably installed on a base 30, and an objective lens 31 is placed on one side thereof. The first and second coil members 35 and 34 are installed to be separated from each other on the base 30. The single magnet member 37 is installed on the blade 32 to be placed between the first and second coil members 35 and 34. Each of the plurality of suspensions 36 is fixed at one end to the blade 32 and fixed at the other end to a holder 33 provided at one side of the base 30, such that the blade 32 can move with respect to the base 30. The plurality of suspensions 36 movably support the blade 32 with respect to the base 30.

The optical pickup actuator is of an asymmetric type in which a driving axis of the optical pickup actuator and an optical axis of the objective lens 31 are disposed differently from each other. The objective lens 31 is installed in an installation hole, formed on one side of the blade 32. An installation portion 32a is formed in the blade 32 so as to install the first and second coil members 35 and 34 and the magnet member 37, opposite to the objective lens 31.

The installation portion 32a has a through-type structure in which the magnet member 37 can be installed between the first and second coil member 35 and 34, by the installation portion 32a of the blade 32, and the first coil member 35 can be installed inside the installation portion 32a. Further, the installation portion 32a is formed such that a portion thereof directly positions the magnet member 37 to oppose the first and second coil members 35 and 34.

The optical pickup actuator includes a magnetic circuit, which includes the first and second coil members 35 and 34 and the magnet member 37.

That is, the first and second coil members 35 and 34 are separated from each other on the base 30, with the magnet member 37 being installed in the blade 32 between the first and second coil members 35 and 34.

Either one of the first and second coil members 35 and 34 may be used as tracking coils and the other may be used as focusing coils. As an example, in FIGS. 2 and 3, the first coil member 35, positioned between the objective lens 31 and the magnet member 37, is used as a tracking coil, and the second coil member 34, positioned outside the blade 32, is used as a focusing coil. The first and second coil members 34 and 35 are driven in the focusing direction F and the tracking direction T so that biaxial movement is possible. Further, as illustrated in FIGS. 2 and 3, the first and second coil members 35 and 34 are bulk-type coils.

FIGS. 2 and 3 illustrate one example of a magnetic circuit that can be applied to the optical pickup actuator, according to an embodiment of the present invention. However, the optical pickup actuator is not limited to the magnetic circuit shown in FIGS. 2 and 3. In the optical pickup actuator, according to embodiments of the present invention, a polarization structure of the magnet member 37 and a type and a driving method of the first and second coil members 35 and 34 can be modified.

That is, a surface polarization magnet having various polarization structures may be used as the magnet member 37. A Fine Pattern Coil (FPC) having variable shapes and arrangements with respect to the various polarization structures of the magnet member 37 may also be used as the first and second coil members 35 and 34.

Figure 4:
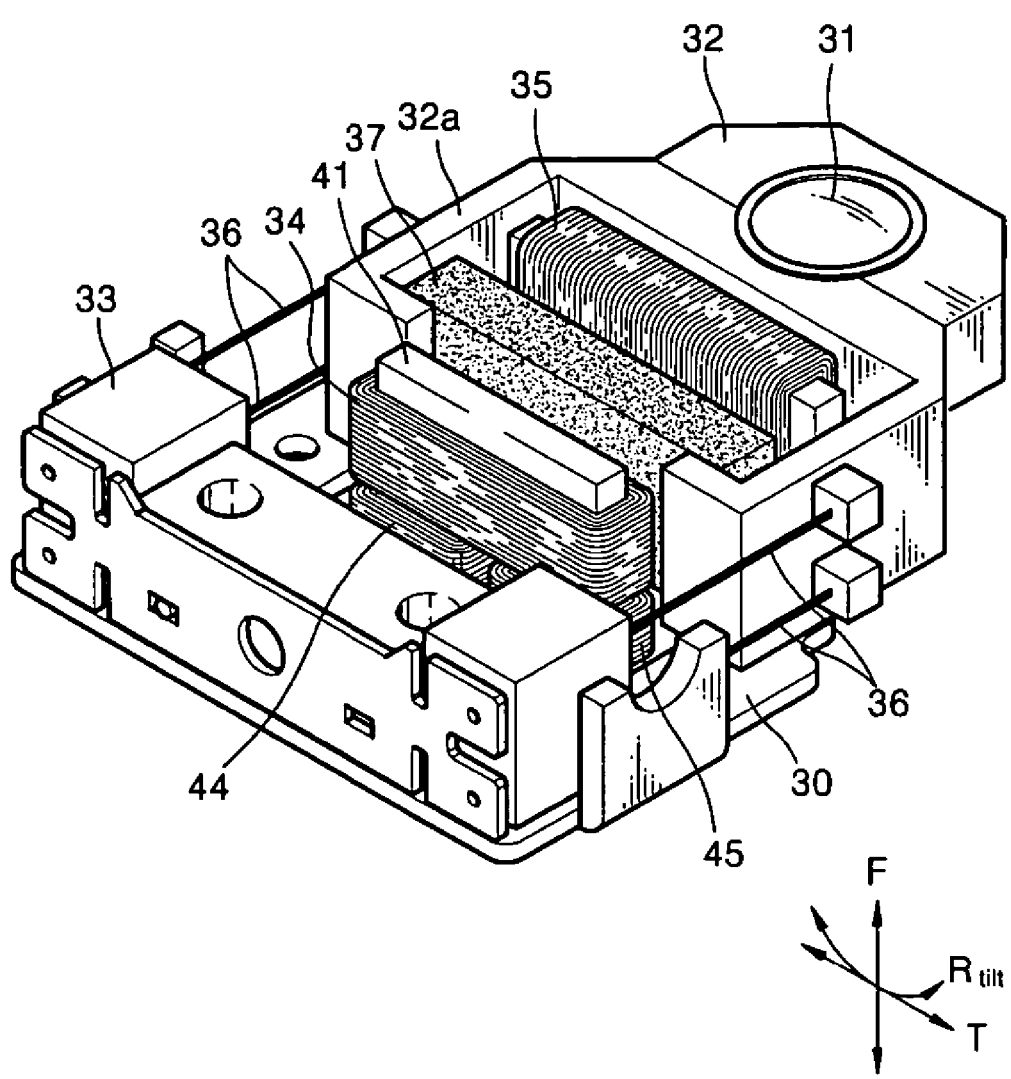
FIG. 4 is a partial exploded perspective view schematically illustrating an optical pickup actuator, according to another embodiment of the present invention.
Figure 5:
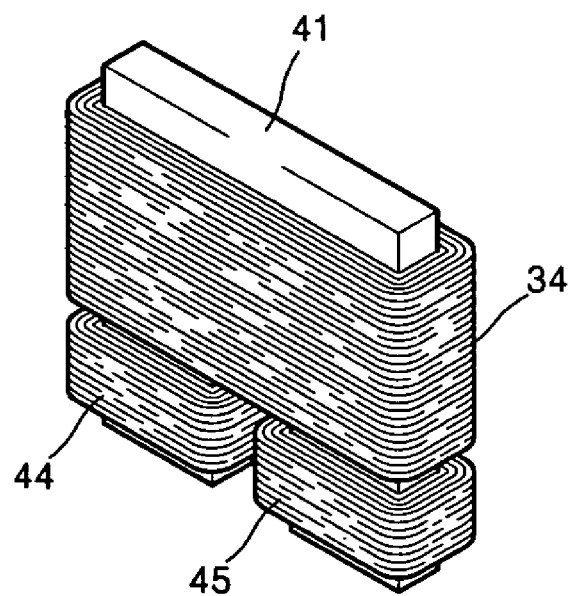
FIG. 5 illustrates only a portion of the coils in the optical pickup actuator of FIG. 4.

The optical pickup actuator according to an embodiment of the present invention, as illustrated in FIGS. 4 and 5, may further include a pair of tilt driving coil members to perform triaxial movement for driving the objective lens 31 in the focusing direction F, the tracking direction T, and a radial tilting direction $R_{tilt}$.

FIG. 4 is a partial exploded perspective view schematically illustrating an optical pickup actuator, according to another embodiment of the present invention, and FIG. 5 illustrates only the coils in the optical pickup actuator of FIG. 4. In FIGS. 4 and 5, the reference numerals are the same as those in FIGS. 2 and 3 for the same corresponding elements, which will not be described again.

It is preferable that a pair of tilt driving coil members 44 and 45 are positioned under a second coil member 34, which may be the focusing coil. Here, in a case where the first and second coil members 35 and 34 and the pair of tilt driving coil members are of a bulk type, the optical pickup actuator can be formed by changing only a shape of a winding yoke to install the second coil member 34 and the pair of tilt driving coil members.

In the optical pickup actuator, a polarization structure of a magnet member 37 and the coil members 34 and 35 may also be modified.

In the optical pickup actuator according to embodiments of the present invention in which the magnet member 37 is installed in the blade 32 between the first and second coil members 35 and 34, since the blade 32 can be formed in a shape in which a back portion of the blade 2 required for installing the focusing coils 4 of the conventional optical pickup actuator shown in FIG. 1 is removed, the blade 32 can have a simple structure. In addition, the simple structure results in a high second resonance frequency and a reduced moving unit size, including the blade 32, thereby reducing the overall size of the optical pickup actuator.

Suspensions 36 are fixed to a side surface different from a side surface where the magnetic circuit of the blade 32 is disposed. The suspensions of the conventional optical pickup actuator are used for electrical connection, but the suspensions 36 according to the present invention may perform only a function of movably supporting the moving unit, including the blade 32, with respect to the base 30. Thus, since no soldering process is required for attaching the suspension 36 to the blade 32, a process for manufacturing the optical pickup actuator according to the present invention can be greatly simplified compared to the conventional optical pickup actuator.

Although the optical pickup actuator according to this embodiment of the present invention includes four suspensions 36, as illustrated in FIGS. 2 and 4, the number of suspensions 36 may be changed to two or six, or more.

The optical pickup actuator, according to embodiments of the present invention in which the magnet member 37 is installed on the blade 32 and the first and second coil members 35 and 34 are installed on the base 30, on opposing sides of the magnet member 37, has at least the following advantages.

First, since a magnet driving method in which only the magnet member 37 of the magnetic circuit is installed in the blade 32 is used, the design performance of the blade 32 does not deteriorate, preventing the objective lens 31 from being damaged due to heat.

Further, since the coil members 34, 35, 44, and 45 are installed in the base 30, the soldering process for electrical connection, with respect to the moving unit, required in the conventional optical pickup actuator is unnecessary. Of course, a soldering process and wire connecting work for electrical connection, to be applied a driving current in the coil members 34, 35, 44, and 45, are needed. However, since the coil members 34, 35, 44, and 45 are installed in the base 30, there is sufficient space on the base 30 to perform the above soldering easily without the need of manual soldering. The size and height, etc., of the soldering is also not greatly limited. Thus, the soldering process can be performed automatically, instead of the conventional manual soldering process. Alternatively, even if the soldering process is performed manually, in embodiments of the present invention, poor soldering rarely occurs. Thus, in the optical pickup actuator according to the present invention, a defect rate can be reduced greatly. Further, the optical pickup process can be improved greatly. In addition, since additional components or processes for electrical connections, with respect to the moving unit, are not necessary, automated production of the optical pickup actuator using an integral injection process is possible. Thus, in an additional embodiment, the optical pickup actuator can be generated using an integral injection process.

Since the suspensions 36 perform only the function of movably supporting the moving unit, including the blade 32, with respect to the base 30, and are not used for electrical connection, the suspensions 36 simply need to be coupled with the blade 32. The movement of the optical pickup actuator, according to embodiments of the present invention can be easily changed to biaxial movement (movement in a focusing direction and a tracking direction) or triaxial movement by changing only the polarization structure of the magnet member 37 and/or the winding pattern of the coil members, without having to change the number of suspensions 36.

Since an unnecessary portion of the focusing coil member of the conventional asymmetric slim optical pickup actuator can be removed, so that the length of the blade 32 is reduced, the second resonance frequency also increases.

The magnet member 37, which is heavier than the coil members, is installed in the blade 32, The PCB, e.g., a soldering portion including at least 8 points when being not driven in a tilting direction or at least 12 points when being driven in a tilting direction, and a portion for guiding the focusing coil member of the blade, which are required in the moving unit of the conventional optical pickup actuator, are not necessary in embodiments of the present invention. Thus, the moving unit can be formed to be no heavier than the moving unit of the conventional optical pickup actuator.

Figure 6:
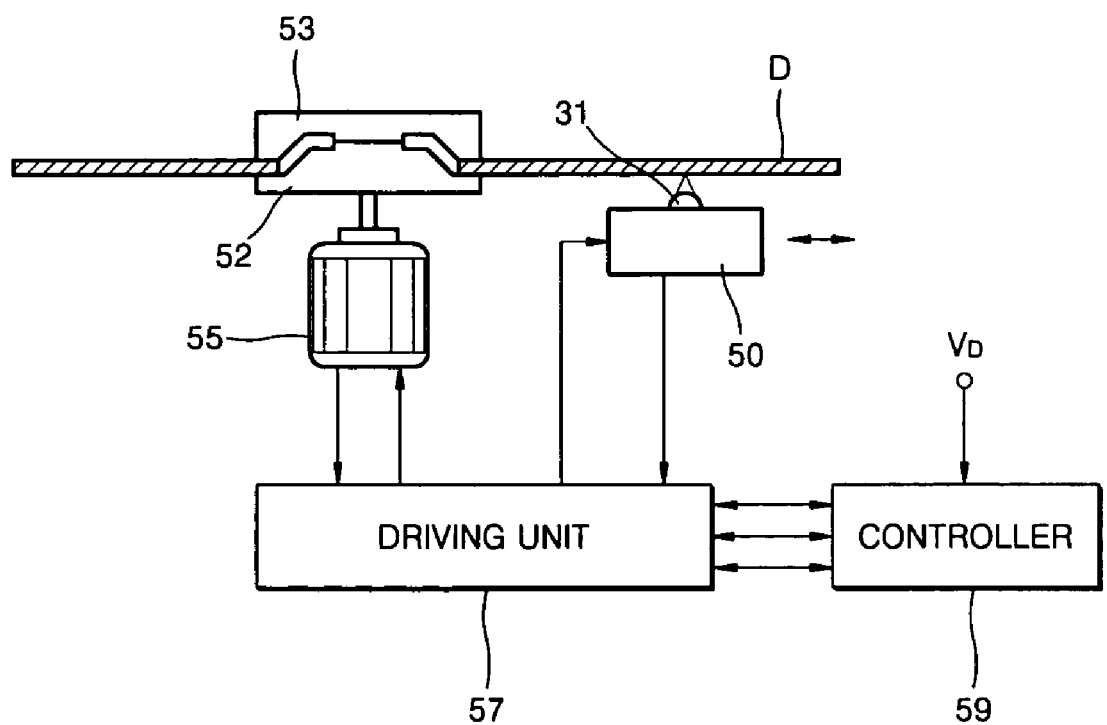
FIG. 6 schematically illustrates an optical recording and/or reproducing apparatus using an optical pickup actuator, according to another embodiment of the present invention.

FIG. 6 schematically illustrates an optical recording and/or reproducing apparatus using an optical pickup actuator according to an embodiment of the present invention.

Referring to FIG. 6, the optical recording and/or reproducing apparatus includes a spindle motor 55 for rotating an optical information storage medium, e.g., an optical disc D, an optical pickup 50 which is movably installed in a radial direction of the optical disc D and records and/or reproduces information on the optical disc D, a driving unit 57 for driving the spindle motor 55 and the optical pickup 50, and a controller 59 for controlling a focusing servo, a tracking servo and/or a tilting servo of the optical pickup 50. Here, reference numeral 52 references a turntable and reference numeral 53 references a clamp for chucking the optical disc D.

The optical pickup 50 includes an optical system having an objective lens 31 that condenses light emitted from a light source onto the optical disc D, and an optical pickup actuator for performing biaxial movement or triaxial movement of the objective lens 31. The optical pickup actuator uses the optical pickup actuator according embodiments of the present invention.

Light reflected off of the optical disc D is detected through a photodetector provided in the optical pickup 50, converted photoelectrically, and registered as an electrical signal. The electrical signal is input to the controller 59 via the driving unit 57. The driving unit 57 controls a rotation speed of the spindle motor 55, amplifies the input electrical signal, and drives the optical pickup 50. The controller 59 sends focusing servo instructions, tracking servo instructions and/or tilting servo instructions, adjusted based on the electrical signal input from the driving unit 57, to the driving unit 57, again, so that a focusing operation, a tracking operation and/or a tilting operation of the optical pickup 50 can be performed.

As described above, since the optical pickup actuator, according to embodiments of the present invention, uses a magnet member driving method in which a coil member, used as a heat generating unit, is separated from a moving unit, even if the actuator is of a slim type, the performance of the moving unit will not be reduced due to heat.

Further, since the number of magnet members is reduced from two to one, and a portion of the blade required in the conventional focusing coil member, due to the asymmetric structure of the optical pickup actuator, can be removed, the length of the blade can be reduced, thereby overcoming the weakness of conventional systems having a reduced second resonance frequency when the resultant size of the optical pickup actuator is reduced.

In addition, in the conventional optical pickup actuator, the required processes for installing coil members and wires in the moving unit is difficult, so numerous processes are required for manufacturing the optical pickup actuator, which results in the defect rate being high. However, according to embodiments of the present invention, since components for electrical connection and current driving are removed from the moving unit and installed in the base, and a process for electrically connecting the components is performed in the base, the manufacture of the optical pickup actuator is easy and the defect rate can be reduced considerably.

Thus, the optical pickup actuator according to embodiments of the present invention is of an asymmetric type and small enough that it can be applied to a slim optical recording and/or reproducing apparatus. The performance of the optical pickup actuator is substantially superior to conventional actuators because problems due to heat are not generated.

While the present invention has been particularly shown and described with reference to embodiments thereof, it will be understood by those of ordinary skill in the art that various changes in form and details may be made therein without departing from the principles and spirt of the present invention as defined by the following claims and their equivalents.

What is claimed is:

1. An optical pickup actuator, comprising:
   a blade with an objective lens;
   a plurality of suspensions coupled at one end to the blade and fixed at another end to a holder, provided at one side of a base, such that the suspensions movably support the blade;
   a focusing coil member and a tracking coil member installed on the base, separated from each other, in an asymmetrical relationship with respect to the lens; and
   a single magnet member installed on the blade between the focusing coil member and the tracking coil member,
   wherein the focusing coil member, the tracking coil member and the single magnet member are installed on one side of the objective lens in an asymmetrical relationship with respect to the lens, and
   wherein the blade on which the single magnet member is installed is not in direct communication with the focusing coil and the tracking coil installed on the base to avoid having the blade receive heat generated from current applied to the coil members.

2. The optical pickup actuator of claim 1, further comprising a pair of tilt driving coil members.

3. The optical pickup actuator of claim 2, wherein the pair of tilt driving coil members are installed under the focusing coil member.

4. The optical pickup actuator of claim 1, wherein the magnet member is a surface polarization magnet.

5. The optical pickup actuator of claim 1, wherein the focusing and tracking coil members are Fine Pattern Coils (FPCs).

6. An optical recording and/or reproducing apparatus, comprising:
   an optical pickup having an actuator for driving an objective lens, and movably installed in a radial direction of a recording medium, and records and/or reproduces information to/from the recording medium; and
   a controller controlling a focusing servo and a tracking servo of the optical pickup,
   wherein the optical pickup actuator includes:
   a blade with an objective lens;
   a plurality of suspensions coupled at one end to the blade and fixed at another end to a holder, provided at one side of a base, such that the suspensions movably support the blade;
   a focusing coil member and a tracking coil member installed on the base, separated from each other, in an asymmetrical relationship with respect to the lens; and
   a single magnet member installed on the blade between the focusing coil member and the tracking coil member, wherein the focusing coil member, the tracking coil member and the single magnet member are installed on one side of the objective lens in an asymmetrical relationship with respect to the lens, and wherein the blade on which the single magnet member is installed is not in direct communication with the focusing coil and the tracking coil installed on the base to avoid having the blade receive heat generated from current applied to the coil members.

7. The optical recording and/or reproducing apparatus of claim 6, further comprising a pair of tilt driving coil members.

8. The optical recording and/or reproducing apparatus of claim 7, wherein the pair of tilt driving coil members are installed under the focusing coil member.

9. The optical recording and/or reproducing apparatus of claim 6, wherein the magnet member is a surface polarization magnet.

10. The optical recording and/or reproducing apparatus of claim 6, wherein the focusing and tracking coil members are Fine Pattern Coils (FPCs).

* * * * *